(No Model.)

G. T. CHAPMAN.
HOOF SPREADER.

No. 476,732. Patented June 7, 1892.

WITNESSES:
Th. J. Morgan
Ernst Maud Lundgren

INVENTOR:
Geo. T. Chapman.
By A. P. Thayer.
his Attorney

UNITED STATES PATENT OFFICE.

GEORGE T. CHAPMAN, OF WHITE PLAINS, ASSIGNOR OF THREE-FOURTHS TO WILLIAM HARVEY MERRITT, OF NEW YORK, N. Y.

HOOF-SPREADER.

SPECIFICATION forming part of Letters Patent No. 476,732, dated June 7, 1892.

Application filed May 1, 1889. Serial No. 309,149. (No model.)

*To all whom it may concern:*

Be it known that I, GEORGE T. CHAPMAN, a citizen of the United States, and a resident of White Plains, in the county of Westchester and State of New York, have invented new and useful Improvements in Hoof-Spreading Tools, of which the following is a specification.

My invention consists of a pair of knuckle-jointed spreading-struts constituting a tool adapted for engaging the inner walls of the hoof close under the sole, so as to spread the hoof temporarily while nailing the shoe on the hoof and without interfering with the application of the shoe, and also being adapted for a heel-expander to be worn temporarily, the objects being to secure the shoe with an expanding stress that will have a spreading tendency on the hoof in cases of contracted hoofs and to continue the expanding stress on the heel after the shoe is applied, all as hereinafter fully described, reference being made to the accompanying drawings, in which—

Figure 2:
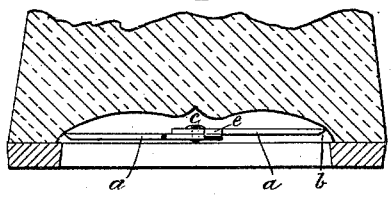
Figure 1:
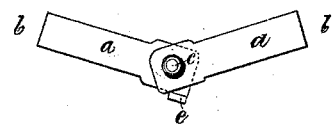
Figure 3:
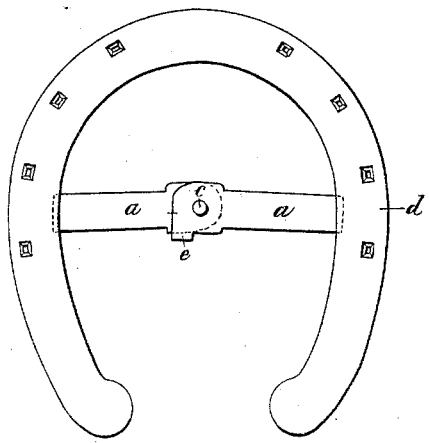
Figure 4:
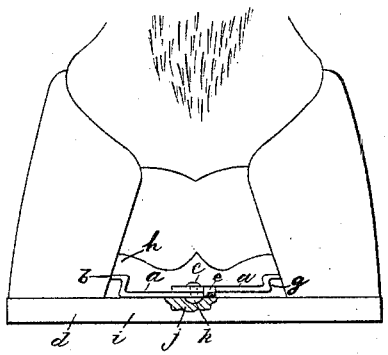
Figure 5:
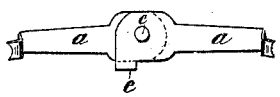
Figure 6:
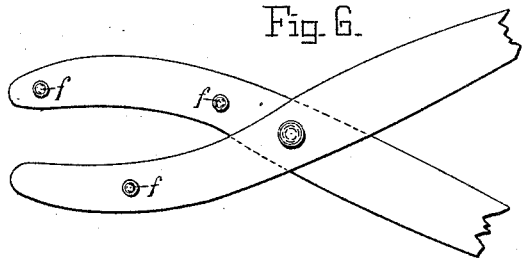

Figure 1 is a plan view of my improved expander. Fig. 2 is a side view of the same with part of a hoof and a shoe in section, showing the mode of using the expander. Fig. 3 is a plan view of the bottom of a shoe with the expander in position. Fig. 4 is a hind elevation of a hoof and side view of the instrument used as a heel-expander. Fig. 5 is a plan view of the expander made with the outer ends adapted for engaging in the heel-clefts for use of the instrument as a heel-expander, and Fig. 6 is a plan view of a pair of blacksmith's tongs with attachments for manipulating the spreader.

I provide two flat steel plates $a$ of suitable dimensions for the purpose, each having one large and preferably rounded end and for the rest of the length being somewhat narrower and having the other ends beveled to make a prominent but not very sharp "biting" edge $b$, and I connect the larger ends together by a strong rivet $c$, making a close pivot-joint preferably working with some friction, and on the pivoted end of one of said struts I provide a stop-lug $e$, which comes in contact with the edge of the other strut when the axis of the pivot-joint passes slightly beyond the line between the two bearing-points of the outer ends of the arms and locks the expander in the extended position and holds it self-actingly while nailing on the shoe.

Such an expander of proper range for the width of the hoof of the case in hand inserted between the inner walls of the hoof, as indicated in Figs. 1 and 3, and extended to the longest condition, as in Fig. 3, will, as is clearly shown, spread the hoof as desired and hold it so while nailing on the shoe $d$.

To utilize the instrument for a heel-expander, I construct the struts with the outer portions offset upward, as at $g$, to reach upward into the heel-clefts $h$ of the hoof and with the ends $b$ turned parallel to the rest, and in this instance preferably notched so as to make pointed spurs. In this use of the instrument it will be inserted over the bar $i$ of a bar-shoe employed to prevent the instrument from dropping out, and the bar may have a socket $j$ to receive the projecting head $k$ of the joint pivot for better effect in preventing the escape of the expander.

The instrument will be made in different lengths for hoofs of different sizes.

To operate the expander, a blacksmith's tongs having a stud-pin, as $f$, in the side of one jaw and two others $g$ near the extremities of the other jaw may be conveniently used as a lever device for applying the force necessary to extend the expander for effecting the expansion of the foot and for subsequently disconnecting it.

What I claim, and desire to secure by Letters Patent, is—

1. The improved hoof-expander consisting of a pair of strut-plates jointed together side by side near one end suitably for extension by shifting the joint in the edgewise direction of the plates from an angular position of the two plates relatively to each other into a right line between the outer extremities, one of said plates having the stop-lug between the pivot and the outer extremity of the other plate and adapted to come to a bearing on said other plate when the pivot has passed slightly beyond said right line and lock the plates in the extended position, said strut-plates having the outer extremities adapted to "bite" in the surfaces of the hoof above the shoe.

2. The improved hoof-expander consisting of a pair of steel plates jointed together side by side near one end suitably for extension by shifting the joint in the edgewise direction of the plates from an angular position of the two plates relatively to each other into a right line between the outer extremities, one of said plates having the stop-lug between the pivot and the outer extremity of the other plate and adapted to come to a bearing on said other plate when the pivot has passed slightly beyond said right line and lock the plates in the extended position, said steel plates having the laterally-offset portions of the outer ends sidewise relatively to them, and the pointed extremities of said offset portions adapted to enter the heel-clefts and bite in the side walls thereof, substantially as described.

In testimony that I claim the foregoing as my invention I have signed my name, in presence of two witnesses, this 26th day of April, 1889.

GEO. T. CHAPMAN.

Witnesses:
W. J. MORGAN,
A. P. THAYER.